US011907097B1

(12) United States Patent
Drutu et al.

(10) Patent No.: US 11,907,097 B1
(45) Date of Patent: Feb. 20, 2024

(54) TECHNIQUES FOR PROCESSING TRACE DATA

(71) Applicant: SPLUNK Inc., San Francisco, CA (US)

(72) Inventors: Bogdan Cristian Drutu, Menlo Park, CA (US); Filip Slunecko, San Francisco, CA (US); Charles Joseph Smith, Raleigh, NC (US); Timothy Matthew Robin Williamson, Santa Barbara, CA (US)

(73) Assignee: SPLUNK Inc., San Francisco, CA (US)

( * ) Notice: Subject to any disclaimer, the term of this patent is extended or adjusted under 35 U.S.C. 154(b) by 0 days.

(21) Appl. No.: 18/104,207

(22) Filed: Jan. 31, 2023

(51) Int. Cl.
*G06F 11/34* (2006.01)
*G06F 11/30* (2006.01)
*H04L 43/04* (2022.01)

(52) U.S. Cl.
CPC ...... *G06F 11/3476* (2013.01); *G06F 11/3075* (2013.01); *H04L 43/04* (2013.01)

(58) Field of Classification Search
CPC ....... G06F 11/3065–3082; H04L 43/04; H04L 43/06
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 10,432,539 B2 * | 10/2019 | Wasay | H04L 43/0888 |
| 10,698,897 B2 * | 6/2020 | Bhattacharjee | G06F 16/951 |
| 10,698,900 B2 * | 6/2020 | Bhattacharjee | G06F 16/90335 |
| 10,726,009 B2 * | 7/2020 | Pal | G06F 16/24554 |
| 10,795,884 B2 * | 10/2020 | Bhattacharjee | G06F 16/2465 |
| 10,896,182 B2 * | 1/2021 | Bhattacharjee | G06F 11/3086 |
| 10,956,415 B2 * | 3/2021 | Pal | G06F 16/1734 |
| 10,977,260 B2 * | 4/2021 | Pal | H04L 67/535 |

(Continued)

OTHER PUBLICATIONS

Splunk Enterprise 8.0.0 Overview, available online, retrieved May 20, 2020 from docs.splunk.com.

(Continued)

*Primary Examiner* — David R Lazaro
(74) *Attorney, Agent, or Firm* — Kilpatrick Townsend & Stockton LLP (57) ABSTRACT

Techniques may include receiving a plurality of spans of trace data at a computing system during a first time period. The techniques may include storing the plurality of spans in a span partition of a data store. The data store can contain a plurality of span partitions with spans that are grouped in the partition by trace identifier. The device may include generating a timestamp partition, with an index of timestamps by trace identifiers, for the first time period. The techniques may include storing the timestamp partition in the data store. Also, the techniques may include identifying at least two timestamp partitions that correspond to a second time period that preceded the first time period. The techniques may include generating and storing a primary compacted timestamp partition by combining the at least two timestamp partitions.

20 Claims, 4 Drawing Sheets

(56) References Cited

U.S. PATENT DOCUMENTS

| | | | | |
|---|---|---|---|---|
| 11,003,682 B2* | 5/2021 | Porath | | G06F 16/2477 |
| 11,010,235 B1* | 5/2021 | Agarwal | | G06F 11/079 |
| 11,023,463 B2* | 6/2021 | Pal | | G06F 16/24422 |
| 11,126,632 B2* | 9/2021 | Pal | | G06F 16/2471 |
| 11,151,137 B2* | 10/2021 | Bhattacharjee | | G06F 16/24554 |
| 11,163,758 B2* | 11/2021 | James | | G06F 16/2282 |
| 11,232,100 B2* | 1/2022 | Bhattacharjee | | G06F 16/2272 |
| 11,243,963 B2* | 2/2022 | Pal | | H04L 67/568 |
| 11,250,069 B1* | 2/2022 | Bianchi | | G06F 16/9038 |
| 11,281,706 B2* | 3/2022 | Pal | | G06F 16/2465 |
| 11,314,753 B2* | 4/2022 | Pal | | G06F 16/211 |
| 11,321,160 B2* | 5/2022 | Agarwal | | G06F 11/0793 |
| 11,321,217 B1* | 5/2022 | Agarwal | | G06F 11/3409 |
| 11,321,321 B2* | 5/2022 | Bhattacharjee | | G06F 16/2471 |
| 11,341,131 B2* | 5/2022 | Pal | | G06F 16/24545 |
| 11,347,578 B2* | 5/2022 | Agarwal | | G06F 11/079 |
| 11,347,622 B1* | 5/2022 | Agarwal | | G06F 3/0482 |
| 11,347,625 B1* | 5/2022 | Agarwal | | G06F 11/3466 |
| 11,379,475 B2* | 7/2022 | Danyi | | G06F 11/3006 |
| 11,388,211 B1* | 7/2022 | Breeden | | G06F 16/24568 |
| 11,416,528 B2* | 8/2022 | Pal | | G06F 16/24554 |
| 11,442,935 B2* | 9/2022 | Pal | | G06F 9/505 |
| 11,461,334 B2* | 10/2022 | Bhattacharjee | | H04L 43/08 |
| 11,481,396 B2* | 10/2022 | Bhattacharjee | | G06F 16/2379 |
| 11,494,380 B2* | 11/2022 | Rao | | H04L 67/10 |
| 11,500,875 B2* | 11/2022 | Bhattacharjee | | G06F 11/3433 |
| 11,516,269 B1* | 11/2022 | Chang, Jr. | | H04L 65/612 |
| 11,526,425 B1* | 12/2022 | Karis | | G06F 11/3452 |
| 11,580,107 B2* | 2/2023 | Pal | | G06F 16/2455 |
| 11,582,316 B1* | 2/2023 | Danyi | | H04L 67/146 |
| 11,586,692 B2* | 2/2023 | Bhattacharjee | | G06F 9/546 |
| 11,593,377 B2* | 2/2023 | Bhattacharjee | | G06F 16/24554 |
| 11,599,541 B2* | 3/2023 | Pal | | G06F 16/24535 |
| 11,604,795 B2* | 3/2023 | Pal | | G06F 16/288 |
| 11,615,087 B2* | 3/2023 | Pal | | G06F 9/4881 707/713 |
| 11,615,104 B2* | 3/2023 | Pal | | G06F 16/211 707/722 |
| 11,620,164 B1* | 4/2023 | Karis | | G06F 9/505 718/104 |
| 11,636,105 B2* | 4/2023 | Pal | | G06F 16/258 707/718 |
| 11,636,160 B2* | 4/2023 | Bianchi | | G06F 11/3072 707/705 |
| 11,663,227 B2* | 5/2023 | Pal | | G06F 16/2471 707/722 |
| 11,693,761 B1* | 7/2023 | Agarwal | | G06F 16/2379 717/128 |
| 11,693,850 B1* | 7/2023 | Agarwal | | G06F 16/244 707/722 |
| 11,726,898 B1* | 8/2023 | Agarwal | | G06F 11/3664 717/125 |
| 2018/0089258 A1* | 3/2018 | Bhattacharjee | | G06F 16/24535 |
| 2018/0089259 A1* | 3/2018 | James | | G06F 16/2425 |
| 2018/0089262 A1* | 3/2018 | Bhattacharjee | | G06F 16/24535 |
| 2018/0089269 A1* | 3/2018 | Pal | | G06F 16/24542 |
| 2018/0089278 A1* | 3/2018 | Bhattacharjee | | H04L 43/12 |
| 2018/0089306 A1* | 3/2018 | Pal | | G06F 16/24535 |
| 2018/0089312 A1* | 3/2018 | Pal | | G06F 16/335 |
| 2018/0089324 A1* | 3/2018 | Pal | | G06F 9/546 |
| 2019/0095488 A1* | 3/2019 | Bhattacharjee | | G06F 16/951 |
| 2019/0095491 A1* | 3/2019 | Bhattacharjee | | G06F 16/24553 |
| 2019/0095493 A1* | 3/2019 | Bhattacharjee | | G06F 7/5324 |
| 2019/0095494 A1* | 3/2019 | Bhattacharjee | | G06F 7/5324 |
| 2019/0095508 A1* | 3/2019 | Porath | | G06F 16/34 |
| 2019/0098106 A1 | 3/2019 | Mungel et al. | | |
| 2019/0138638 A1* | 5/2019 | Pal | | G06F 16/285 |
| 2019/0138639 A1* | 5/2019 | Pal | | G06F 16/211 |
| 2019/0138640 A1* | 5/2019 | Pal | | G06F 16/2471 |
| 2019/0138641 A1* | 5/2019 | Pal | | G06F 16/27 |
| 2019/0138642 A1* | 5/2019 | Pal | | G06F 16/2471 |
| 2019/0147084 A1* | 5/2019 | Pal | | G06F 40/205 707/769 |
| 2019/0147085 A1* | 5/2019 | Pal | | G06F 16/24542 707/718 |
| 2019/0147086 A1* | 5/2019 | Pal | | G06F 16/2425 707/718 |
| 2019/0147092 A1* | 5/2019 | Pal | | H04L 67/125 707/713 |
| 2019/0182167 A1* | 6/2019 | Wasay | | H04L 47/25 |
| 2019/0258631 A1* | 8/2019 | Pal | | G06F 16/22 |
| 2019/0258632 A1* | 8/2019 | Pal | | G06F 16/2455 |
| 2019/0258635 A1* | 8/2019 | Pal | | G06F 16/2272 |
| 2019/0258636 A1* | 8/2019 | Bhattacharjee | | G06F 16/24549 |
| 2019/0258637 A1* | 8/2019 | Bhattacharjee | | G06F 16/24549 |
| 2019/0272271 A1* | 9/2019 | Bhattacharjee | | G06F 16/2471 |
| 2019/0310977 A1* | 10/2019 | Pal | | G06F 16/2455 |
| 2020/0050586 A1* | 2/2020 | Pal | | G06F 16/1734 |
| 2020/0050607 A1* | 2/2020 | Pal | | G06F 16/24549 |
| 2020/0050612 A1* | 2/2020 | Bhattacharjee | | G06F 16/24526 |
| 2020/0065303 A1* | 2/2020 | Bhattacharjee | | G06F 16/278 |
| 2020/0257680 A1* | 8/2020 | Danyi | | G06F 11/302 |
| 2020/0257691 A1* | 8/2020 | Bhattacharjee | | G06F 16/901 |
| 2020/0364223 A1* | 11/2020 | Pal | | G06F 16/24539 |
| 2020/0364279 A1* | 11/2020 | Pal | | G06F 16/24568 |
| 2020/0372007 A1* | 11/2020 | Ross | | H04L 43/18 |
| 2021/0049177 A1* | 2/2021 | Bhattacharjee | | G06F 16/24554 |
| 2021/0117425 A1* | 4/2021 | Rao | | H04L 9/0866 |
| 2021/0133014 A1* | 5/2021 | Agarwal | | G06F 11/0772 |
| 2021/0133015 A1* | 5/2021 | Agarwal | | G06F 11/36 |
| 2021/0216391 A1* | 7/2021 | Agarwal | | G06F 11/0769 |
| 2021/0294801 A1* | 9/2021 | Pal | | G06F 16/258 |
| 2022/0121628 A1* | 4/2022 | Devaraj | | G06F 16/1824 |
| 2022/0156335 A1* | 5/2022 | Bhattacharjee | | G06F 16/90335 |
| 2022/0277042 A1* | 9/2022 | Bianchi | | G06F 16/9035 |
| 2022/0327125 A1* | 10/2022 | Pal | | G06F 16/24545 |
| 2022/0327149 A1* | 10/2022 | Pal | | G06F 16/26 |
| 2023/0049579 A1* | 2/2023 | Bhattacharjee | | G06F 16/901 |
| 2023/0144450 A1* | 5/2023 | Bhattacharjee | | G06F 11/3433 707/718 |
| 2023/0147068 A1* | 5/2023 | Rao | | H04L 67/10 707/719 |
| 2023/0156093 A1* | 5/2023 | Danyi | | G06F 16/906 709/227 |
| 2023/0177047 A1* | 6/2023 | Pal | | G06F 16/24535 707/769 |
| 2023/0214386 A1* | 7/2023 | Pal | | G06F 16/258 707/713 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

TECHNIQUES FOR PROCESSING TRACE DATA

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data").

In some examples, trace data may be generated by software or based on hardware parameters associated with a computing system on which the software is operating (e.g., processor usage). For example, trace data can include log data, performance data, diagnostic data, metrics, tracing data, or any other data that can be analyzed to diagnose equipment performance problems, monitor user interactions, and to derive other insights.

Monitoring certain trace data in real-time or near real-time may be desirable for some applications. For example, it may be useful to monitor performance data or metrics, such as processor usage or memory usage, in real-time to allow for identification of problems as they occur. Tracking trace data in real-time or over various time periods (e.g., hours, days, weeks, months) can also allow for identification of patterns and can be useful for scaling resources, for example. In some cases, it can be useful to consolidate or compile trace data generated in real-time (e.g., every second) over longer periods (e.g., minutes, hours, days, etc.) to allow for easier visualization and interpretation or analysis of the trace data.

BRIEF DESCRIPTION OF THE DRAWINGS

Illustrative examples are described in detail below with reference to the following figures.

DETAILED DESCRIPTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, techniques may include receiving a plurality of spans of trace data at a computing system during a first time period. Each span of the plurality of spans may include at least one of trace data, a trace identifier, an organization identifier, or a timestamp. The techniques also include storing the plurality of spans in a partition of a data store. The data store can contains a plurality of partitions and the plurality of spans can be grouped in the partition by trace identifier. Techniques may furthermore include identifying, in the data store, at least two partitions that correspond to a second time period that preceded the first time period. The techniques may in addition include generating a primary compacted partition by combining the at least two partitions. The techniques may moreover include storing the primary compacted partition to the data store. Embodiments of these techniques include corresponding methods computer systems, apparatus, and computer programs recorded on one or more computer storage devices, each configured to perform the actions of the techniques.

Techniques, which may be embodied herein as systems, computing devices, methods, algorithms, software, code, computer readable media, or the like, are described herein for storing and processing trace data in large quantities, without limitation, for use by a query system. This trace data can be used by an organization to monitor performance in a distributed system. The disclosed techniques can provide efficiency in storing large quantities of trace data so that certain trace data can be efficiently located by a query system. For example, an ingestion system can associate spans in the trace data with trace identifiers and store the spans as objects in data partitions (e.g., span partitions) of a long-term, low-cost, or low resource usage data storage system (e.g., data store. Each span partition can contain spans of trace data generated by an organization during a time period (e.g., during one-minute intervals), and the spans can be mapped to timestamps using trace identifier to timestamp mappings that are stored in timestamp partitions of a data store. A query service system can use the trace identifier mappings to locate trace data in the span partitions. However, the stored trace data (e.g., spans) can be difficult to locate in the data store because, depending on the size of the time periods, and the organization's data retention policies, the query system may need to search a large number of these timestamp partitions in order to locate a particular object in a span partition.

To reduce the total search space, the timestamp partitions can be compacted, or combined, into partitions that represent larger windows of time. These timestamp partitions can be maintained by the ingestion system, and the query system can use the timestamp partitions to locate spans of trace data associated with a particular trace identifier in span partitions. To speed searches, these timestamp partitions can be combined (e.g., compacted) based on how recently the timestamp partition was created, resulting in an ordered series of compacted timestamp partitions that represent monotonically increasing windows of time. Searches of the trace data in the span partitions can be used to diagnose errors in a distributed application, and compaction can limit the total number of timestamp partitions that the query system may need to search in order to locate a span partition containing an object.

It will be appreciated that the above-described aspects may be implemented as methods, systems, computing devices, and/or non-transitory computer readable media. For example, a system or computing device may comprise one or more processors and a non-transitory computer-readable storage medium having stored thereon instructions that, when executed by the one or more processors, may cause the one or more processors to perform operations, such as operations corresponding to methods described herein. In another example, a non-transitory computer-readable storage medium may comprise or have stored thereon instructions that, when executed by the one or more processors, may cause the one or more processors to perform operations, such as operations corresponding to methods described herein.

The term embodiment and like terms are intended to refer broadly to all of the subject matter of this disclosure and the claims below. Statements containing these terms should be understood not to limit the subject matter described herein or to limit the meaning or scope of the claims below.

Embodiments described herein are useful for searching, analyzing, visualizing, storing, organizing, or otherwise using trace data, such as for purposes of determining the state or condition of a system, such as to trigger an event based on the state or condition of the system or other conditions. For example, trace data can be raw machine data that is generated by various components in IT environments, such as servers, sensors, routers, mobile devices, Internet of Things (IoT) devices, etc. Trace data can include log data, network packet data, sensor data, application program data, error log data, stack trace data, performance data, metrics, tracing data, diagnostic data, and many other types of data.

The trace data may be organized as time series data, where each data point may have or be associated with one or more times or timestamps, such as a raw time, a receipt time, a publication time, etc., one or more values or metrics, such as a numerical measurement that can change over time (e.g., processor usage, network latency, total transactions or transactions per unit time, etc.), and optionally metadata, such as one or more identifiers, dimensions, tags, labels, or other custom properties that may indicate characteristics of or associated with the data that may or may not change over time (e.g., a metric name or metric type of the data point, a server IP address or hostname, etc.). In some implementations, trace data and other time series data may be used for various applications, such as for identification of patterns or anomalies.

In some examples, it may be desirable to monitor multiple streams of trace data from multiple sources and transform the data, such as for purposes of alerting or triggering on the original or transformed data or to visualize the original or transformed data, such as to evaluate anomalies, understand patterns, or alter resource usage, for example. In some examples, the trace data can be generated by an application, or system of applications, implemented by a service such as a container service (e.g., Docker, Kubernetes, etc.) or a microservice. A service can be an autonomous unit of software that interacts with other services to form a complete application, and each service can represent a collection of application performance interface (API) endpoints and operations that can work with other services to deliver the functionality of an application. Each service can perform operations, a specific action performed by the service, and groups of these actions are called traces. A trace can be a collection of spans and a trace can represent a unique transaction handled by an application.

An application can be monitored by an ingest service which collects spans from the services that comprise the application. The spans can be assigned a trace identifier and timestamp when the trace is created by a service. However, in some implementations, the ingest can label the collected spans with a unique identifier that is associated with a particular span (e.g., a trace identifier), and, for example, the ingest can assign the same trace identifier to each span in a trace. In addition, the service can label the collected spans with a timestamp and additional unique identifiers such as an organization identifier that represents the organization that created, controls, or monitors the application or service that generated a particular span. Upon or after the expiration of a time period, the ingest service can store the collected traces to partitions in a data store. The ingest service can organize the collected spans in the partitions by timestamp, trace identifier, and organization identifier. For example, the ingest service can group and store spans by organization identifier so that a span partition is divided into contiguous sections that contain all spans for all traces generated by an organization during the time period.

An organization may wish to locate spans from a particular trace to troubleshoot an application or service's performance. However, a particular trace can have spans that were generated at different time periods, and consequently the spans are located in different span partitions. In addition, each span partition can contain spans generated by multiple organizations and multiple traces. Accordingly, it can be difficult for the query system to efficiently locate an individual span across multiple span partitions. This difficulty can be addressed with timestamp partitions that contain a timestamp to trace identifier mapping that shows which span partitions contain a particular trace identifier. The ingest service can create timestamp partitions while the ingest service is creating the span partitions.

The query service can search the timestamp partitions in the data store to locate the relevant span partitions that contain a particular trace identifier, and, upon locating the relevant span partitions, the query service can retrieve the spans associated with the particular identifier. This partition search can be performed using any appropriate searching algorithm such as binary search. The length of the search of each timestamp partition can be related to the size of that timestamp partition. Larger size timestamp partitions can speed up the search because a binary search of a larger sorted list will exclude more of the search space with each step in the search. However, the ingest latency (e.g., the time from when a span is created until when the span can be accessed by a customer) increases as the timestamp partition size is increased. As a result, it can be desirable to limit the size of recently generated timestamp partitions, to improve ingest time for recent timestamp partitions, while increasing the size of later timestamp partitions to improve the efficiency of searches on older spans after their initial ingestion.

While smaller timestamp partitions can speed recent searches, such partitions may increase the search space significantly. For example, an organization may have a data retention policy that requires eight days of trace data and the ingest system can store trace data in one-minute timestamp partitions (e.g., timestamp partitions that contain trace identifier to timestamp mappings corresponding to one minute time periods). A query for such a customer could require searching 11,520 timestamp partitions (e.g., 60 partitions per hour*24 hours per day*8 days=11,520 partitions) and a search for a customer with a 30-day retention policy could involve searching 43,200 timestamp partitions (e.g., 60 partitions per hour*24 hours per day*30 days=43,200 partitions).

The total search space can be limited by combining (e.g., compacting) older timestamp partitions. For example, timestamp partitions for the last twenty minutes of stream time can be stored in memory for rapid search. Stream time is the time defined by events seen in a stream of data. (e.g., the stream time can be based on when a span was created, executed, or reported to the ingest service) After twenty minutes, the twenty timestamp partitions from the twenty-minute window of stream time can be combined into a single twenty-minute timestamp partition and persisted to block storage (e.g., as a primary compacted timestamp partition). After three hours, the nine timestamp partitions generated during the three-hour window of stream time can be compacted into a single three-hour timestamp partition in the block storage (e.g., into a secondary compacted timestamp partition). Every day, the last twenty-four hours' worth of three-hour timestamp partitions (e.g., eight three-hour timestamp partitions) can be combined into a single one-day timestamp partition (e.g., into a tertiary compacted timestamp partition).

In an illustrative example, an organization's employee has been assigned to troubleshoot error tickets for the organization. During her shift, the employee receives a ticket indicating that a customer is experiencing an error message when trying to redeem a coupon on the organization's website. To troubleshoot the error, the employee needs to locate the spans for a particular trace identified in the ticket. Accordingly, the employee enters a trace identifier from the ticket into the query service using a computing device. The query service searches the timestamp partitions in the data store to locate three span partitions containing spans from the trace. The query service retrieves the spans from the located span partitions and presents the spans to the user as part of a graphical user interface so that the customer can determine the root cause of the error message.

Figure 1:
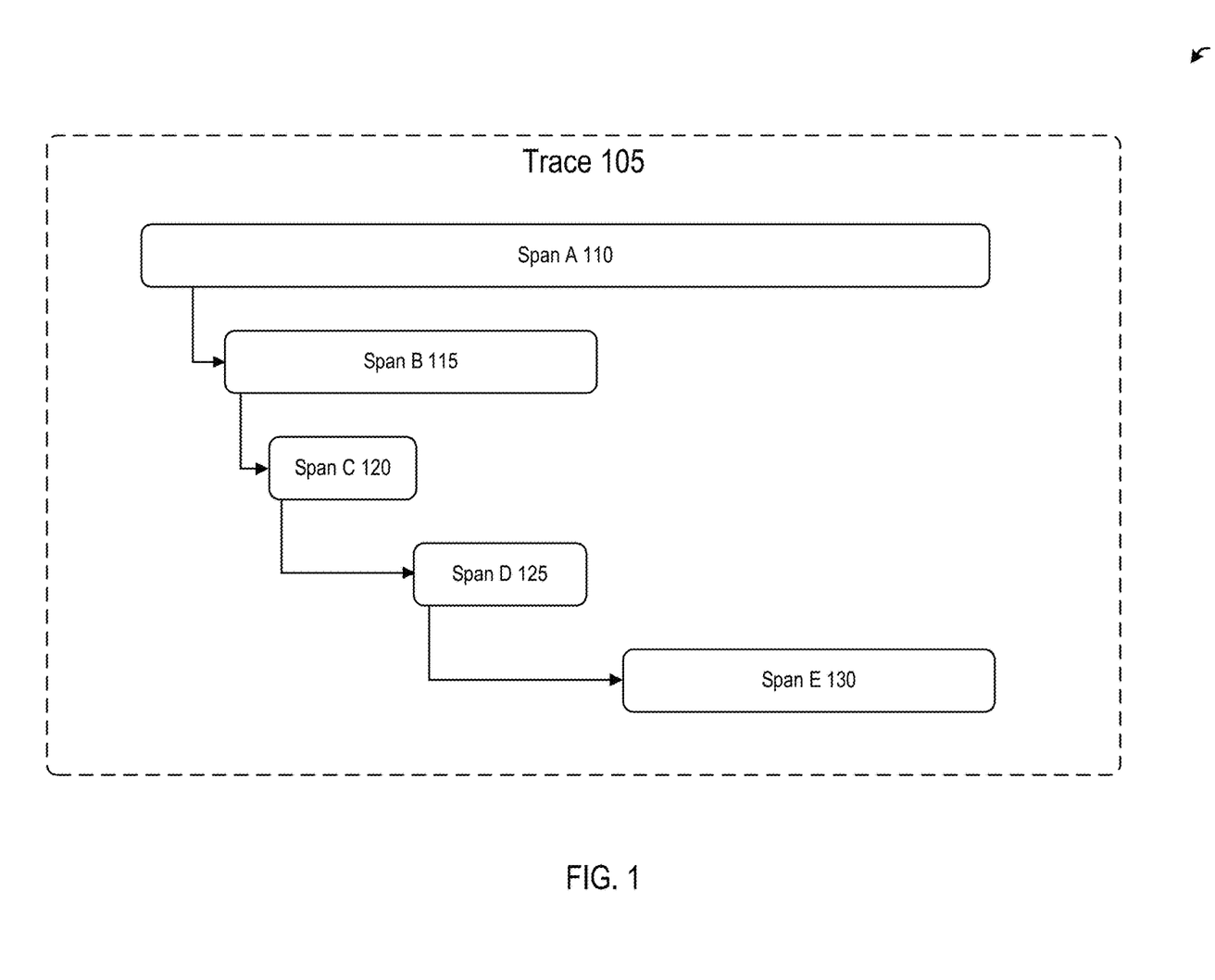
FIG. 1 shows a simplified diagram of a trace with spans according to at least one embodiment.

FIG. 1 shows a simplified diagram 100 of a trace with spans according to at least one embodiment. A trace, such as trace 105 can be a collection of operations that represents a unique transaction handled by an application and its constituent services. A span, such as span A 110, span B 115, span C 120, span D 125, or span E 130, can represent a single operation within a trace. A span might refer to another span as its parent, indicating a relationship between operations involved in the trace. For example, span A 110 is a parent span, and span B 115 is a child span of span A 110. This relationship could indicate that, for example, span A 110 makes a service call that triggers the operation captured by span B 115. A span can be both a child span and a parent span, and, for example, span B 115 can be the parent of span C 120, which is the parent of span D 125 which is the parent of span E 130. Trace 105 can contain as few as one span or as many spans as necessary to complete the transaction represented by the trace.

Figure 2:
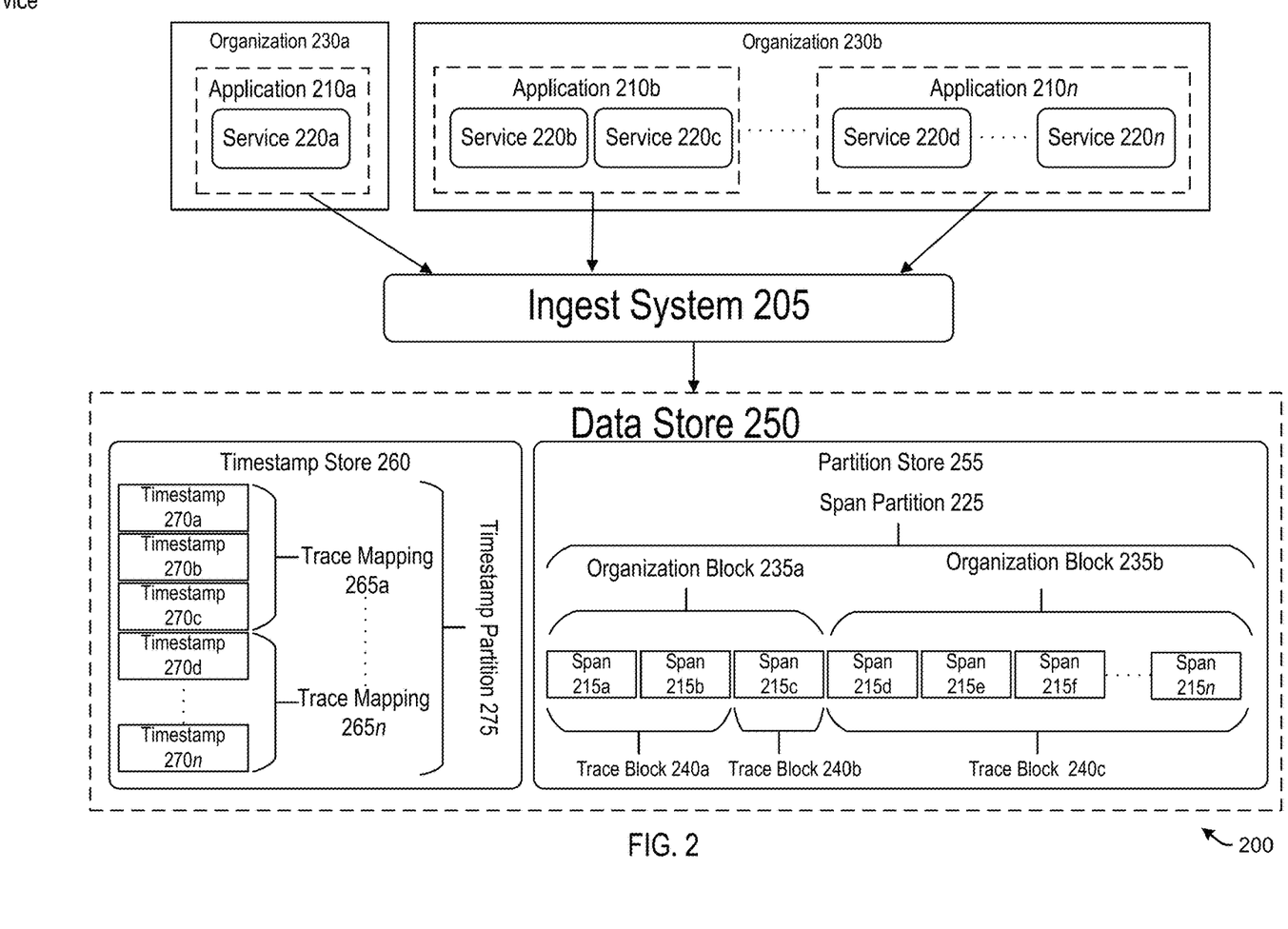
FIG. 2 shows a simplified diagram of an ingest system according to at least one embodiment.

FIG. 2 shows a simplified diagram 200 of an ingest system (e.g., ingester) according to at least one embodiment. The ingest system 205 can be a computing device that is configured to receive trace data from one or more applications such as application 210a, application 210b, or application 210n. The ingest system 205 can receive this trace data from the applications via a network connection such as a wired or wireless connection to a local area network, a wide area network, or the internet. The trace data received by the ingest system 205 can include spans, such as span 215a, span 215b, span 215c, span 215d, span 215e, span 215f or span 215n, associated with one or more timestamps (e.g., timestamp 270a, timestamp 270b, timestamp 270c, timestamp 270d, timestamp 270n), and these spans/timestamps can be generated by one or more services in the applications. The applications can be distributed applications and the services in an application can be computing devices (e.g., server, virtual machine, or bare metal machine) that collectively perform the functionality of the application. Each application can comprise one or more services with application 210a including service 220a; application 210b including both service 220b and service 220c; and application 210n including service 220d and one or more additional services (e.g., service 220n).

The spans/timestamps, received at the ingest system 205, can be generated by the services and sent to the ingest either asynchronously, as the spans are executed, or in batches at regular intervals (e.g., every 30 seconds). The ingest system 205 can be a computing device and the ingest can store the received spans/timestamps in local memory before persisting the spans to the data store 250 where the spans are stored in a span partition 225 of one or more partitions in a partition store 255. The span partition 225 can store the spans received by the ingest system 205 during a time period. For instance, the time period can be 1 minute, 2 minutes, 3 minutes, 5 minutes, 10 minutes, 20 minutes, 30 minutes, 1 hour, 2 hours, 3 hours, 6 hours, 12 hours, 1 day, 2 day, 3 days, 1 week, etc.

The ingest system 205 can sort, arrange, and otherwise transform the received spans. The spans can be separated into contiguous blocks within the span partition in partition store 255 with all of the received spans corresponding to one organization grouped together and all of the received spans for a second organization stored in a second block. For example, the partition can include a block comprising span 215a, span 215b, and span 215c, which were generated by applications associated with organization 230a. This organization block 235a can contain spans generated by service 220a in application 210a because that was, in this example, the only span in organization 230a that generated spans in the current time period. However, organization 230a may include additional services or applications that did not generate spans during the current time period and are not shown in simplified diagram 200. Continuing the example, organization block 235b can be associated with organization 230b and the block can include span 215d, span 215e, span 215f, and 215n which were generated by service 220b, service 220c, service 220d, and service 220n respectively.

Within each organization block of the span partition 225, the spans can be organized into contiguous groups of spans that were generated as part of the same trace (e.g., trace block 240a, trace block 240b, trace block 240c) and therefore have the same trace identifier. Each span can include a timestamp representing when the span was scheduled, created, executed, or provided to the ingest system 205. The timestamps associated with the partition store 255 can be stored in a timestamp partition 275 of timestamp store 260 within data store 250. The timestamps can be organized in each timestamp partition 275 into trace mappings 265a-265n with each timestamp (e.g., timestamp 270a-270n) in a mapping being associated with a trace identifier. A trace mapping in a timestamp partition 275 can include one or more timestamps grouped into contiguous blocks with, for example, trace mapping 265a including timestamp 270a, timestamp 270b, and timestamp 270c and trace mapping 265n including timestamp 260d-260n. These timestamps can be arranged in chronological order within the trace mapping and timestamp 270a can be the timestamp of a first span associated with a particular trace identifier, timestamp 270b being the second timestamp of a second span that is associated with the particular trace identifier, and timestamp 270c being a third span associated with the particular trace identifier. For instance, timestamp 270a can be associated with a span that occurred before the time period associated with partition 225, timestamp 270b can be associated with span 215a, and timestamp 270c can be associated with span 215b. In some embodiments, the timestamps in the timestamp partition 275 can be ordered by trace identifier. Using the timestamps, these spans can be organized within each trace mapping in the order that the spans were created, but in some implementations, the timestamp may not have sufficient resolution to determine an exact order (e.g., the timestamp is day:hour:min and the time period is 1 minute). For example, the order for timestamp 270b and timestamp 270c may be identical because of a lack of resolution even though timestamp 270c could be created before timestamp 270b (e.g., the spans for the timestamps may be generated during the same minute).

Figure 3:
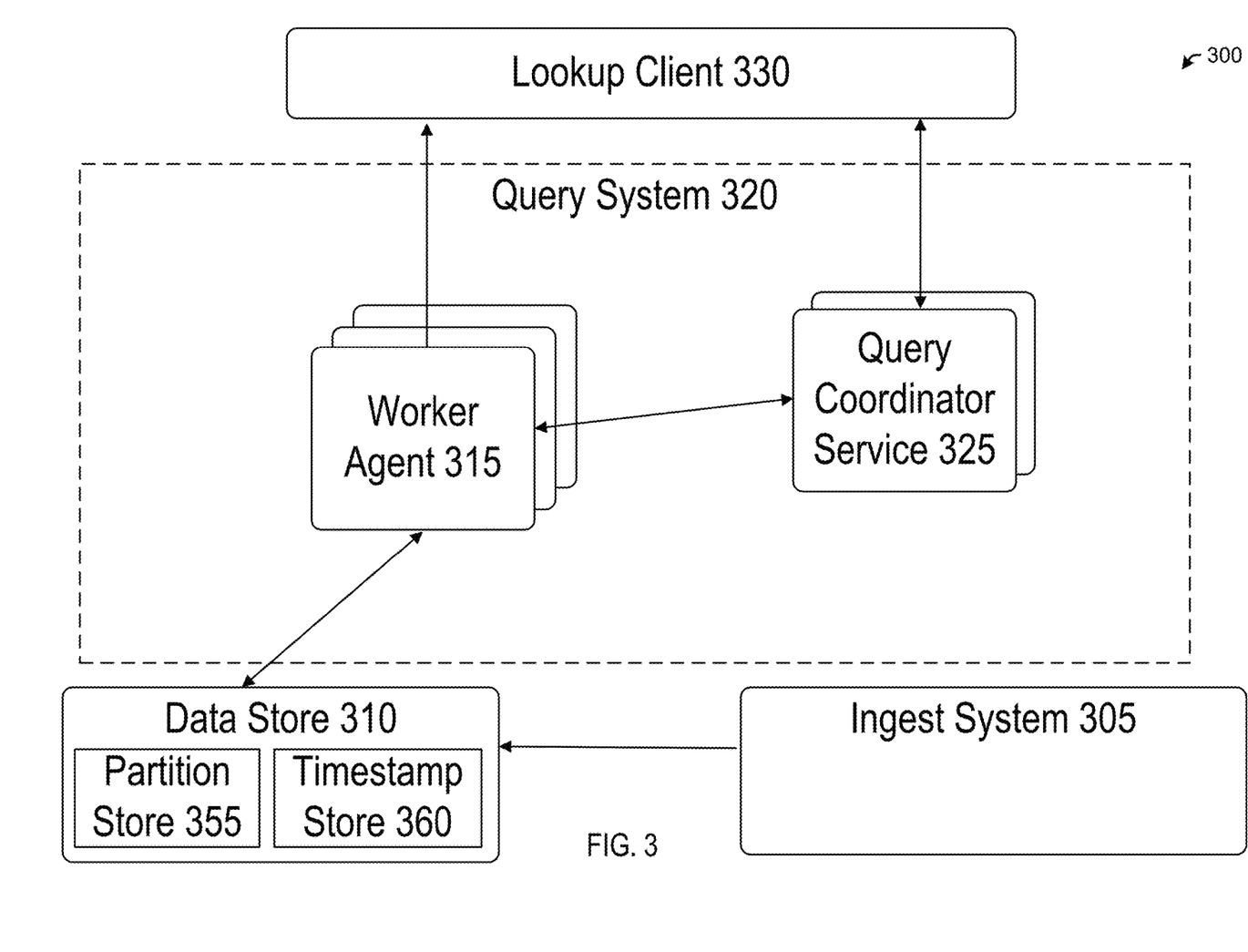
FIG. 3 shows a simplified diagram of a query service system according to at least one embodiment.

FIG. 3 shows a simplified diagram 300 of a query system according to at least one embodiment. As described above, ingest system 305 can store trace data in a data store 310 with each partition (e.g., each timestamp partition or span partition) in the data store 310 corresponding to a different time period in some embodiments with the timestamp partitions in partition store 360 storing trace identifier to timestamp mappings for all span partitions in the partition store 355. The data store 310 can be sharded (e.g., one or more of span partitions the partition store 355 and one or more of the timestamp partitions in the timestamp store 360 being sharded by organization) and a worker agent 315 in the query system 320 can be assigned to each shard in the data store 310. The query coordinator service 325 can be a service (e.g., part of an application) that exposes an application programming interface to a lookup client 330. The lookup client can be a computing device that fields search requests from client computing devices. The query system 320 can include two or more query coordinator services (e.g., query coordinator service 325) so that the service is able to handle search requests from the lookup client 330.

The query coordinator service 325 can receive a request for a particular trace identifier via an application programming interface that the coordinator exposes to the lookup client 330. The query coordinator uses a hashing algorithm to determine which of the shards in the timestamp store 360 contains the trace identifier. The timestamps associated with the trace identifier can be retrieved from the relevant timestamp partitions (e.g., timestamp partition 275) in timestamp store by the worker agent 315. Upon determining which span partition, and shard, in the partition store 355 contains the timestamps labeled with the trace identifier, the query coordinator instructs the worker agent 315 to retrieve the spans from the partition store 355 using the trace mappings from the timestamp store 360. In some circumstances, spans labeled with the trace identifier may be stored in multiple span partitions within multiple shards of the partition store 355, and, accordingly, multiple worker agents may be assigned to retrieve the spans labeled with the trace identifier from the partition store 355. A header in each span partition of the partition store 355, or each shard in the span partition, can provide offsets for shards labeled with a particular organization identifier, or shards labeled with a particular trace identifier, and the assigned worker agent 315 can use the offsets to quickly retrieve the labeled spans using the trace identifier to timestamp mapping retrieved from the timestamp partition. The worker agent 315 may provide the retrieved spans to the lookup client or the worker agent 315 may provide the retrieved spans to the lookup client 330 via the query coordinator service 325.

The query system 320 may be used to combine (e.g., compact) two or more timestamp partitions, from the timestamp store 360 in data store 310, into a single compacted timestamp partition. The timestamp partitions generated by the ingest system may contain spans generated during a short time period such as one partition for each minute. However, the organizations generating these spans may have data retention policies that require days or weeks of data to be stored in the data store 310. For a month-long data retention policy, this can mean that a search for a particular trace identifier may require the query system to search 42,300 minutes' worth of timestamp partitions. This search space can be reduced by combining these timestamp partitions into a smaller number of compacted timestamp partitions at regular intervals.

The timestamp partitions may be compacted in stages so that more recently generated spans are in smaller partitions while older spans are in larger partitions. For example, timestamp partitions may be uncompacted until the number of uncompacted timestamp partitions reaches a primary compaction threshold. The threshold can be a number of timestamp partitions, a time period that has passed since the previous round of compaction, etc. In this example, the timestamp partitions, representing one minute time periods, remain uncompacted until a total of twenty partitions have been added to the data store 310 by the ingest system 305. Upon or after the threshold has been reached, a worker agent 315 can perform a primary round of compaction by retrieving the timestamp partitions from memory and combining the timestamp partitions into a primary compacted partition. Continuing the example, the twenty one-minute timestamp partitions can be combined into one twenty-minute primary compacted timestamp partition. While combining the timestamp partitions, the worker agent 315 can use the spans timestamps to determine the order of blocks in the compacted timestamp partition as described above with respect to FIG. 2.

A primary compacted timestamp partition may undergo a secondary round of compaction once the number of primary compacted timestamp partitions reaches a secondary compaction threshold (e.g., a second timeperiod). For example, the secondary compaction threshold may be nine primary compacted timestamp partitions so that a secondary compacted timestamp partition corresponds to a three-hour time period. The worker agent 315 may combine the nine primary compacted timestamp partitions into a secondary compacted partition, and, while combining the timestamp partitions, the worker agent 315 can use the spans timestamps to determine the order of blocks in the secondary compacted partition as described above with respect to FIG. 2.

A secondary compacted timestamp partition may undergo a tertiary round of compaction once the number of secondary compacted timestamp partitions reaches a tertiary compaction threshold (e.g., a third time period). For example, the secondary compaction threshold may be one-days worth of secondary compacted timestamp partitions and a tertiary compacted timestamp partition can correspond to a twenty-four-hour time period. The worker agent 315 may combine the eight secondary compacted timestamp partitions into a secondary compacted timestamp partition, and, while combining the timestamp partitions, the worker agent 315 can use the spans' timestamps to determine the order of blocks in the secondary compacted partition as described above with respect to FIG. 2. The worker agent 315 can perform a greater or smaller number of rounds of compaction in some embodiments.

A timestamp partition, and any associated span partitions, may be deleted from the data store 310 if the timestamp(s) for some or all of the spans within the timestamp partition, or the span partition, exceeds a fourth threshold (e.g., fourth time period). This fourth threshold can be based on the data retention policy for the organizations with data stored in the timestamp partition or span partition, and, in some embodiments, the timestamp partition or span partition may only contain data from organizations with the same data retention policy.

Figure 4:
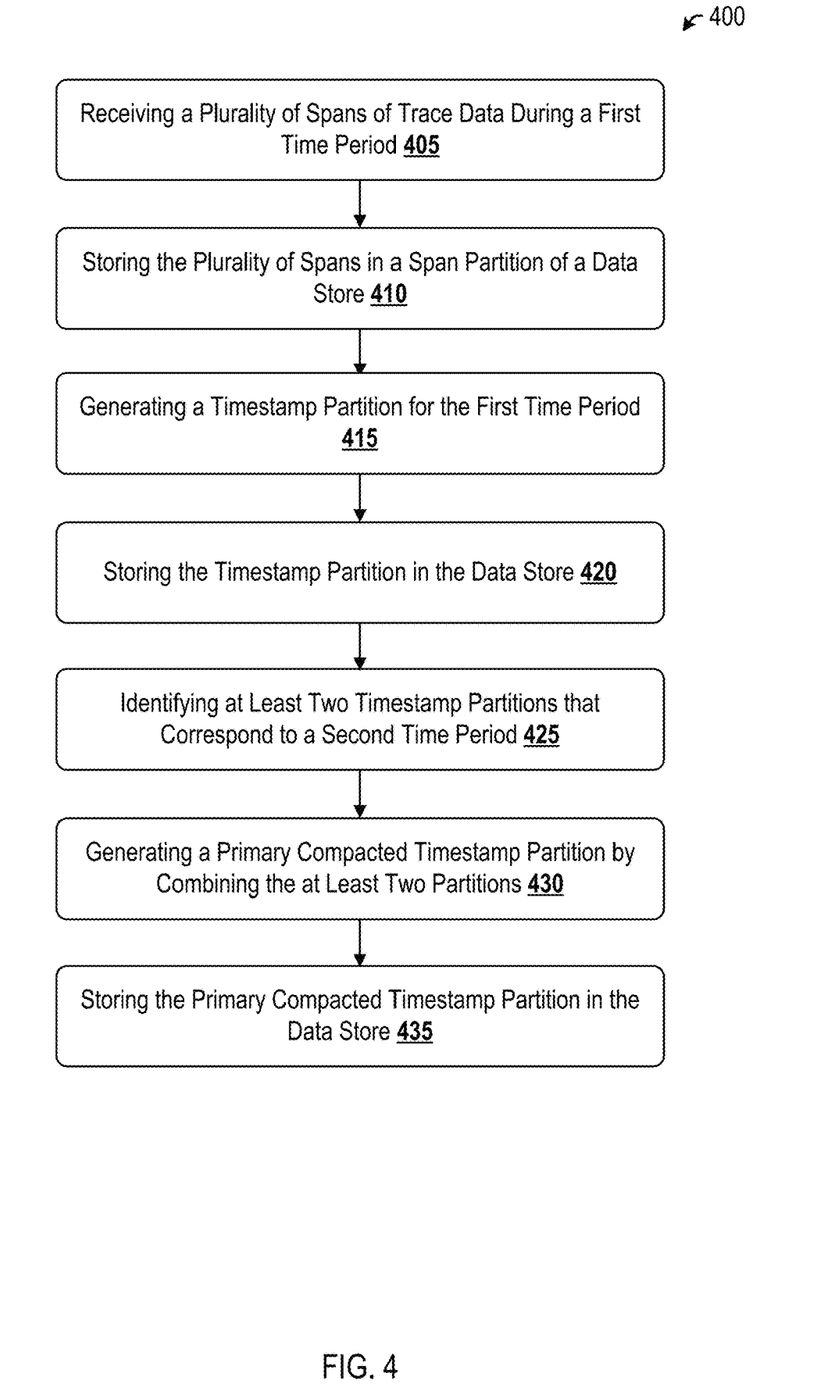
FIG. 4 shows a flowchart of a process for processing trace data according to at least one embodiment.

FIG. 4 shows a flowchart of a process 400 for processing trace data according to at least one embodiment. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to process 400 in greater detail, at block 405, a plurality of spans of trace data can be received at a computing system during a first time period. The time period can be 1 minute, 2 minutes, 3 minutes, 5 minutes, 10 minutes, 20 minutes, 30 minutes, 1 hour, 2 hours, 3 hours, 6 hours, 12 hours, 1 day, 2 day, 3 days, 1 week, etc. The computing system can be a computing system that includes an ingest system such as ingest system 305. Each span in the plurality of spans can comprise at least one of trace data, a trace identifier, an organization identifier, or a timestamp (e.g., trace data labeled with a trace identifier, an organization identifier, or a timestamp). Trace data can be data generated by a span of a trace, a trace identifier can be a unique identifier associated with the trace, the organization identifier can be a unique identifier associated with an organization controlling the computing devices that generated the trace data, and a timestamp can be time and date format (e.g., second:minute:hour:day:month:year) documenting when the span was created or provided to the computing system.

At block 410, the plurality of spans from 410 can be stored in a span partition of a data store. The data store can be a data store such as data store 250, data store 310 timestamp store 260, timestamp store 360, a hard disk drive, a solid disk drive, block storage, etc., and the plurality of spans can be stored by a computing device (or system of computing devices) such as ingest system 205 or ingest system 305. The data store can contain a plurality of span partitions, and, for instance, these span partitions can contain trace data that was generated in one or more time periods. The one or more time periods can be the same length as the time period from 410. The plurality of spans in the span partition can be grouped by trace identifier, organization identifier or a combination thereof. For example, the spans for a trace can be grouped together as trace groups and the trace groups for an organization can be grouped together. The spans in these groups can be placed in an order based on the timestamp for each span (e.g., with the earliest timestamp first or the latest timestamp first).

At block 415, a timestamp partition can be generated for the first time period. The timestamp partition can be a timestamp partition such as timestamp partition 275, and the timestamp partition can be a list of timestamps that are indexed by trace identifiers. The timestamp partition can be used during a search to locate span partitions that contain the trace identifier (e.g., a trace identifier can be used to locate timestamps in the timestamp partition). The timestamp partition can be generated by the ingest system 205 or ingest system 305.

At block 420, the timestamp partition from 415 can be stored in the data store. The timestamp partition from 415 can be stored in a timestamp store (e.g., timestamp store 260, timestamp store 360) of a data store (e.g., data store 250, data store 310).

At block 425, at least two partitions that correspond to a second time period can be identified. The second time period can be a time period that precedes the first time period, and a timestamp partition that contains time stamps generated during the second time period can correspond to the second time period. The timestamp partitions can be identified by a worker agent 315 of the query system 320, and the timestamp partitions may be identified using a hash function. In some implementations, at least two primary compacted timestamp partitions that correspond to a third time period preceding the second time period can be identified, at least two secondary compacted timestamp partitions that correspond to a fourth time period preceding the third time period can be identified, at least two tertiary compacted timestamp partitions that correspond to a fourth time period preceding the third time period can be identified, or one or more timestamp partitions with timestamps from a fifth time period can be identified.

At block 430, a primary compacted partition can be generated by combining the partitions identified at 415. The partitions can be combined by a worker agent of the query system such as worker agent 315. The plurality of spans in the primary compacted partition can be grouped by trace identifier, organization identifier or a combination thereof. For example, the spans for a trace can be grouped together as trace groups and the trace groups for an organization can be grouped together. In some implementations, the primary compacted timestamp partitions identified at 425 can be combined to produce a secondary compacted timestamp partition, the secondary compacted timestamp partition identified at 425 can be combined to produce a tertiary compacted timestamp partition. In some implementations the one or more timestamp partitions (e.g., timestamp partitions, primary compacted timestamp partitions, secondary compacted timestamp partitions, tertiary compacted timestamp partitions) with timestamps in the fifth time period can be deleted.

At block 440, the primary compacted timestamp partition from 430 can be stored to the data store. The primary compacted timestamp partition can be stored by a worker agent of the query system such as worker agent 315. The stored primary compacted timestamp partition, and any other timestamp partitions in the data store (e.g., timestamp partitions, primary compacted timestamp partitions, secondary compacted timestamp partitions, tertiary compacted timestamp partitions) can be searched for timestamps associated with a requested trace identifier. The timestamps associated with the requested trace identifier can be received at a lookup client 330, and the timestamps can be used to locate span partitions containing spans associated with the requested trace identifier. The located span partitions can be searched for the trace identifier and any spans labeled with the trace identifier or organization identifier can be provided to the lookup client.

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrases "at least one of X, Y or Z" or "X, Y, and/or Z" as used in general is to convey that an item, term, etc. may be include X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. § 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method, comprising:
   receiving a plurality of spans of trace data at a computing system during a first time period, where each span of the plurality of spans comprises at least one of trace data, a trace identifier, an organization identifier, or a timestamp;
   storing the plurality of spans in a span partition of a data store, where the data store contains a plurality of span partitions;
   generating a timestamp partition for the first time period, where the timestamp partition comprises an index of timestamps by trace identifiers;
   storing the timestamp partition in the data store, where the data store contains a plurality of timestamp partitions;
   identifying, in the data store, at least two timestamp partitions that correspond to a second time period that preceded the first time period;
   generating a primary compacted timestamp partition by combining the at least two timestamp partitions; and
   storing the primary compacted timestamp partition to the plurality of timestamp partitions in the data store.

2. The method of claim 1, further comprising:
   receiving, from a computing device, a search request comprising a requested trace identifier;
   performing, by the computing system, a search of the plurality of timestamp partitions to identify one or more time stamps associated with the requested trace identifier,
   locating one or more span partitions, of the plurality of span partitions, associated with the one or more timestamps;
   locating one or more spans associated with the requested trace identifier in the located one or more span partitions; and
   providing the identified spans to the computing device.

3. The method of claim 1, further comprising:
   identifying, in the data store, at least two primary compacted timestamp partitions corresponding to a third time period that preceded the second time period;
   generating a secondary compacted timestamp partition by combining the at least two primary compacted timestamp partitions; and
   storing the secondary compacted timestamp partition to the data store.

4. The method of claim 3, further comprising:
   Identifying, in the data store, at least two secondary compacted timestamp partitions corresponding to a fourth time period that preceded the third time period;
   generating a tertiary compacted timestamp partition by combining the at least two secondary compacted timestamp partitions; and
   storing the tertiary compacted timestamp partition to the data store.

5. The method of claim 4, further comprising:
   identifying one or more tertiary compacted timestamp partitions with indexes that contain timestamps that were generated before the fourth time period; and
   deleting the identified one or more tertiary compacted timestamp partitions.

6. The method of claim 4, wherein the first time period is one (1) minute, the second time period is twenty (20) minutes, the third time period is three (3) hours, and the fourth time period is one (1) day.

7. The method of claim 1, wherein the plurality of spans of trace data are generated by two or more organizations with the same data retention policy.

8. A computing device, comprising:
   a processor; and
   a non-transitory computer-readable medium having stored thereon instructions that, when executed by the processor, cause the processor to perform operations comprising:
   receiving a plurality of spans of trace data at a computing system during a first time period, where each span of the plurality of spans comprises at least one of trace data, a trace identifier, an organization identifier, or a timestamp;

storing the plurality of spans in a span partition of a data store, where the data store contains a plurality of span partitions;

generating a timestamp partition for the first time period, where the timestamp partition comprises an index of timestamps by trace identifiers;

storing the timestamp partition in the data store, where the data store contains a plurality of timestamp partitions;

identifying, in the data store, at least two timestamp partitions that correspond to a second time period that preceded the first time period;

generating a primary compacted timestamp partition by combining the at least two timestamp partitions; and storing the primary compacted timestamp partition to the plurality of timestamp partitions in the data store.

9. The computing device of claim 8, wherein the operations further comprise:

receiving, from a computing device, a search request comprising a requested trace identifier;

performing, by the computing system, a search of the plurality of timestamp partitions to identify one or more time stamps associated with the requested trace identifier;

locating one or more span partitions, of the plurality of span partitions, associated with the one or more timestamps;

locating one or more spans associated with the requested trace identifier in the located one or more span partitions; and providing the identified spans to the computing device.

10. The computing device of claim 8, wherein the operations further comprise:

identifying, in the data store, at least two primary compacted timestamp partitions corresponding to a third time period that preceded the second time period;

generating a secondary compacted timestamp partition by combining the at least two primary compacted timestamp partitions; and storing the secondary compacted timestamp partition to the data store.

11. The computing device of claim 10, wherein the operations further comprise:

Identifying, in the data store, at least two secondary compacted timestamp partitions corresponding to a fourth time period that preceded the third time period;

generating a tertiary compacted timestamp partition by combining the at least two secondary compacted timestamp partitions; and storing the tertiary compacted timestamp partition to the data store.

12. The computing device of claim 11, wherein the operations further comprise:

identifying one or more tertiary compacted timestamp partitions with indexes that contain timestamps that were generated before the fourth time period; and deleting the identified one or more tertiary compacted timestamp partitions.

13. The computing device of claim 11, wherein the first time period is one (1) minute, the second time period is twenty (20) minutes, the third time period is three (3) hours, and the fourth time period is one (1) day.

14. The computing device of claim 8, wherein the plurality of spans of trace data are generated by two or more organizations with the same data retention policy.

15. A non-transitory computer-readable medium comprising instructions that, when executed by one or more processors, cause the one or more processors to perform operations comprising:

receiving a plurality of spans of trace data at a computing system during a first time period, where each span of the plurality of spans comprises at least one of trace data, a trace identifier, an organization identifier, or a timestamp;

storing the plurality of spans in a span partition of a data store, where the data store contains a plurality of span partitions;

generating a timestamp partition for the first time period, where the timestamp partition comprises an index of timestamps by trace identifiers;

storing the timestamp partition in the data store, where the data store contains a plurality of timestamp partitions;

identifying, in the data store, at least two timestamp partitions that correspond to a second time period that preceded the first time period;

generating a primary compacted timestamp partition by combining the at least two timestamp partitions; and storing the primary compacted timestamp partition to the plurality of timestamp partitions in the data store.

16. The non-transitory computer readable of claim 15, wherein the operations further comprise:

receiving, from a computing device, a search request comprising a requested trace identifier;

performing, by the computing system, a search of the plurality of timestamp partitions to identify one or more time stamps associated with the requested trace identifier;

locating one or more span partitions, of the plurality of span partitions, associated with the one or more timestamps;

locating one or more spans associated with the requested trace identifier in the located one or more span partitions; and providing the identified spans to the computing device.

17. The non-transitory computer readable of claim 15, wherein the operations further comprise:

Identifying, in the data store, at least two primary compacted timestamp partitions corresponding to a third time period that preceded the second time period;

generating a secondary compacted timestamp partition by combining the at least two primary compacted timestamp partitions; and storing the secondary compacted timestamp partition to the data store.

18. The non-transitory computer readable of claim 17, wherein the operations further comprise:

identifying, in the data store, at least two secondary compacted timestamp partitions corresponding to a fourth time period that preceded the third time period;

generating a tertiary compacted timestamp partition by combining the at least two secondary compacted timestamp partitions; and storing the tertiary compacted timestamp partition to the data store.

19. The non-transitory computer readable of claim 18, wherein the operations further comprise:

Identifying one or more tertiary compacted timestamp partitions with indexes that contain timestamps that were generated before the fourth time period; and deleting the identified one or more tertiary compacted timestamp partitions.

20. The non-transitory computer readable medium of claim 18, wherein the first time period is one (1) minute, the second time period is twenty (20) minutes, the third time period is three (3) hours, and the fourth time period is one (1) day.

\* \* \* \* \*